No. 799,229. PATENTED SEPT. 12, 1905.
R. D. FILDES.
HYDRAULIC PRESSURE MACHINE.
APPLICATION FILED FEB. 6, 1902.

Witnesses:
Inventor:
Rollin D. Fildes
By Paul Synnestvedt
Att'y

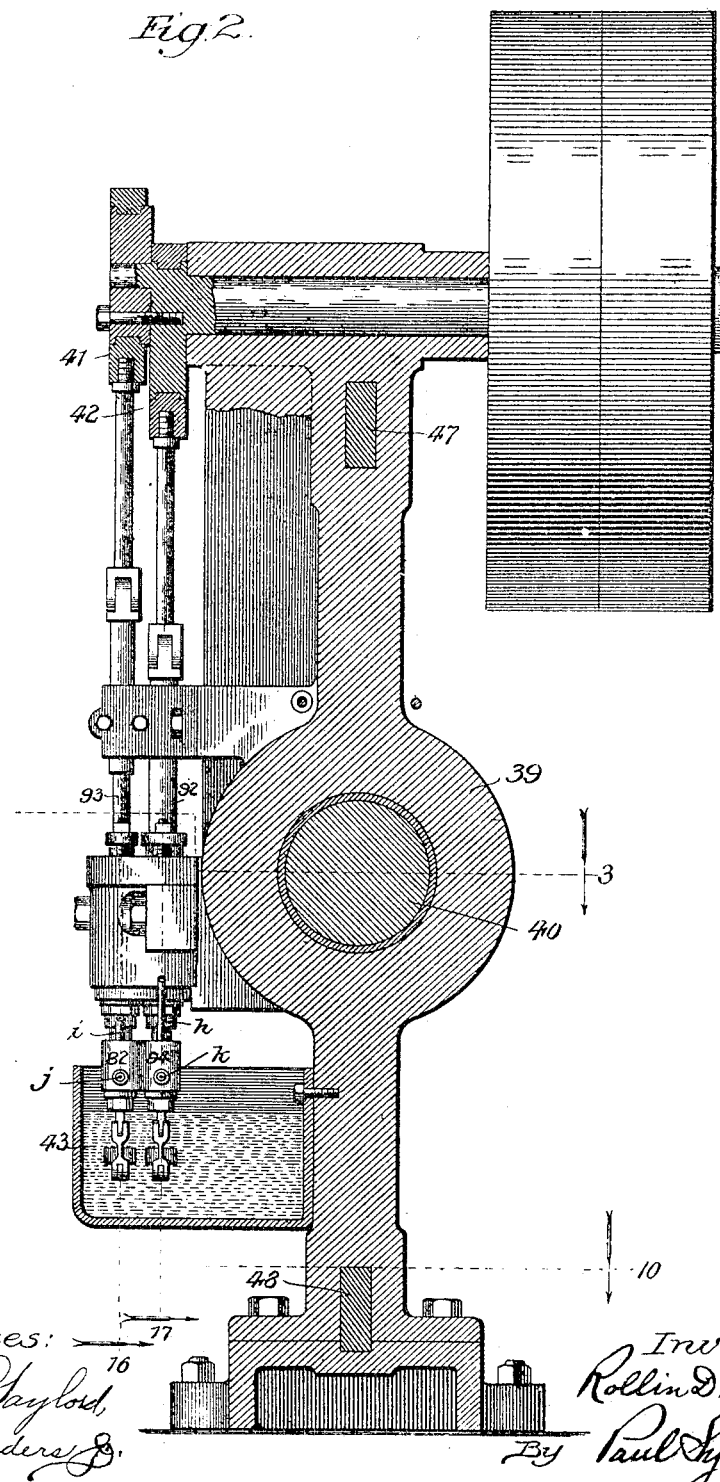

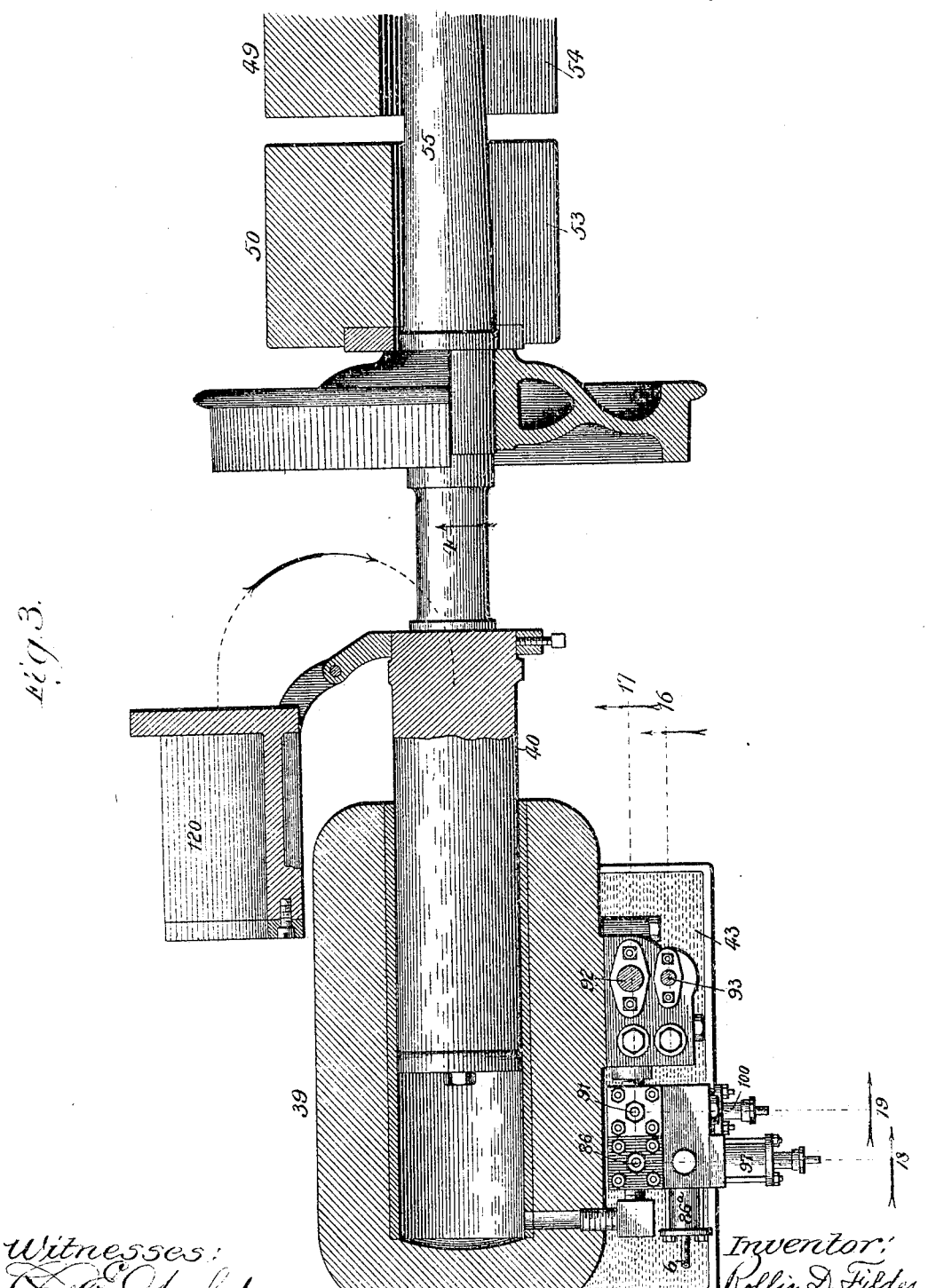

No. 799,229. PATENTED SEPT. 12, 1905.
R. D. FILDES.
HYDRAULIC PRESSURE MACHINE.
APPLICATION FILED FEB. 6, 1902.
16 SHEETS—SHEET 4.
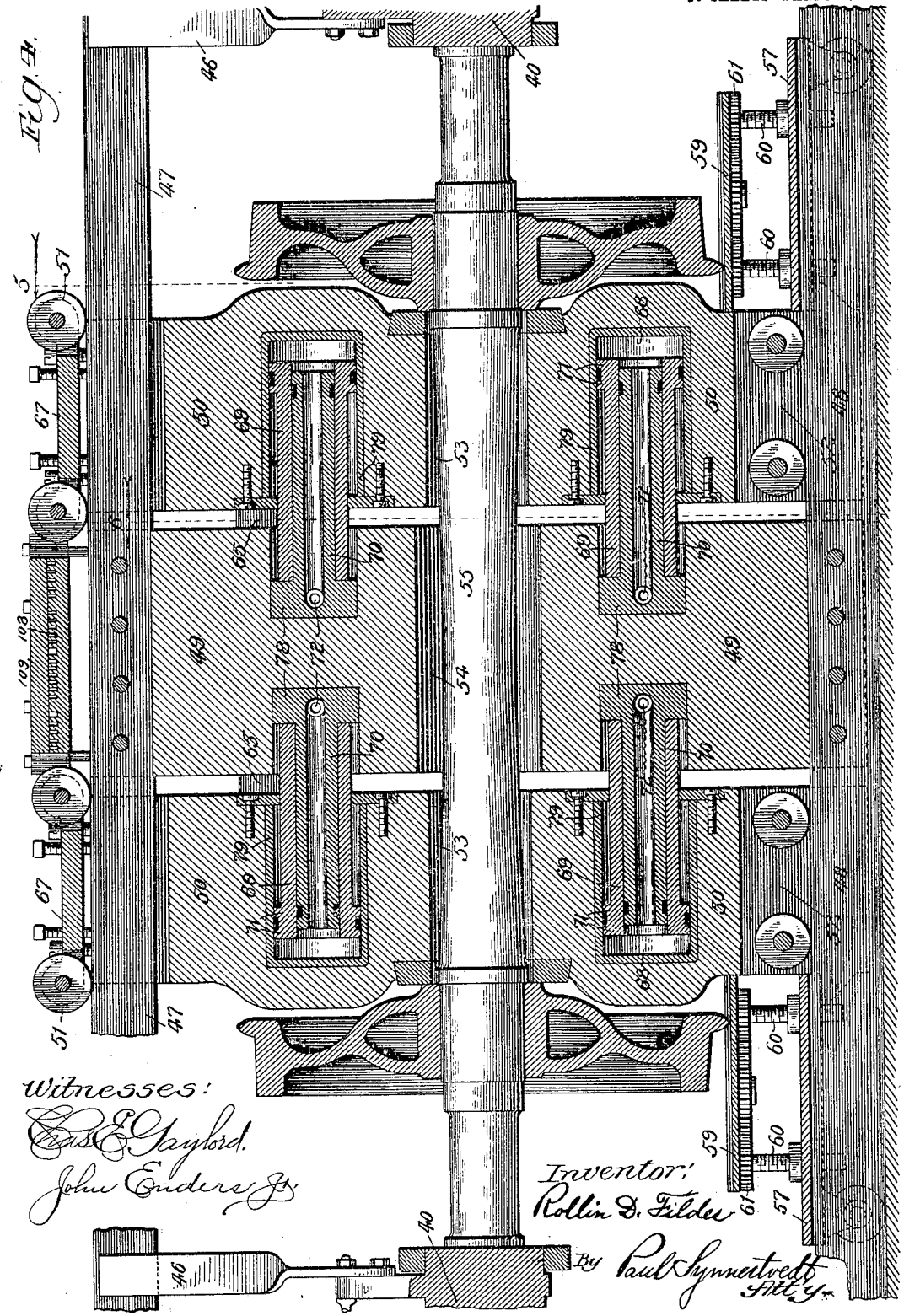
Witnesses:
Chas. E. Gaylord.
John Enders Jr.
Inventor:
Rollin D. Fildes
By Paul Synnestvedt
Atty.

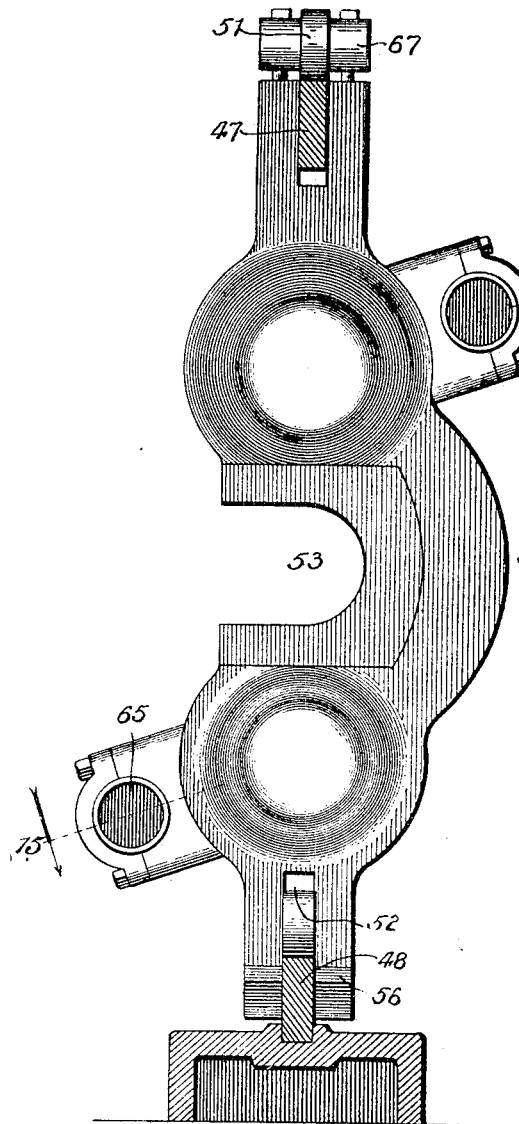
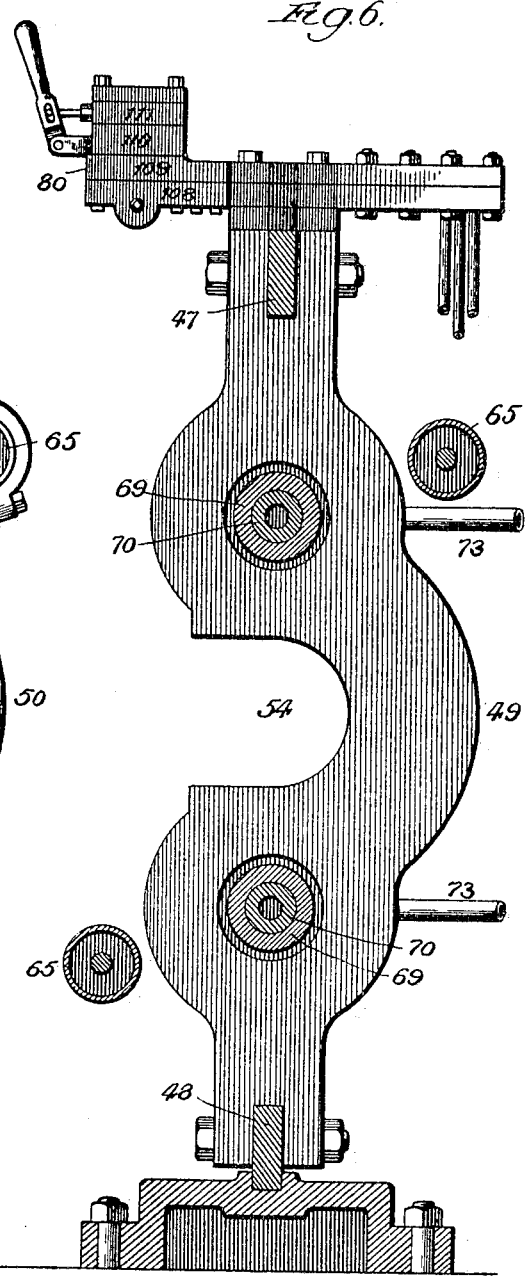

No. 799,229. PATENTED SEPT. 12, 1905.
R. D. FILDES.
HYDRAULIC PRESSURE MACHINE.
APPLICATION FILED FEB. 6, 1902.
16 SHEETS—SHEET 6.
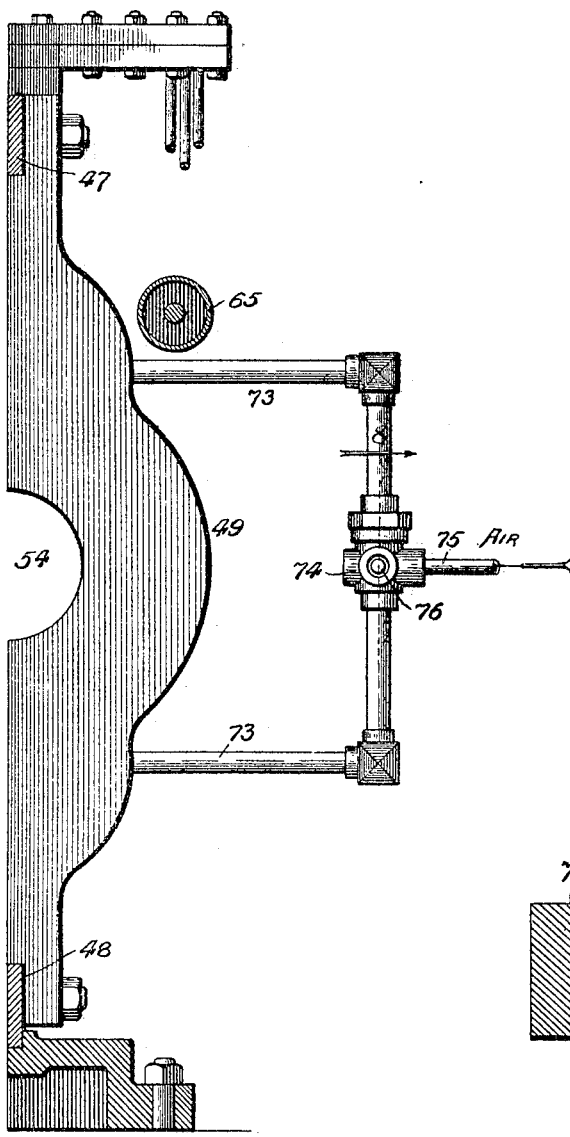
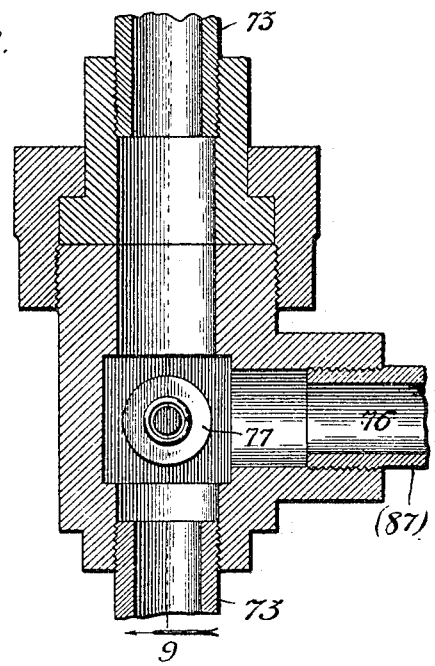
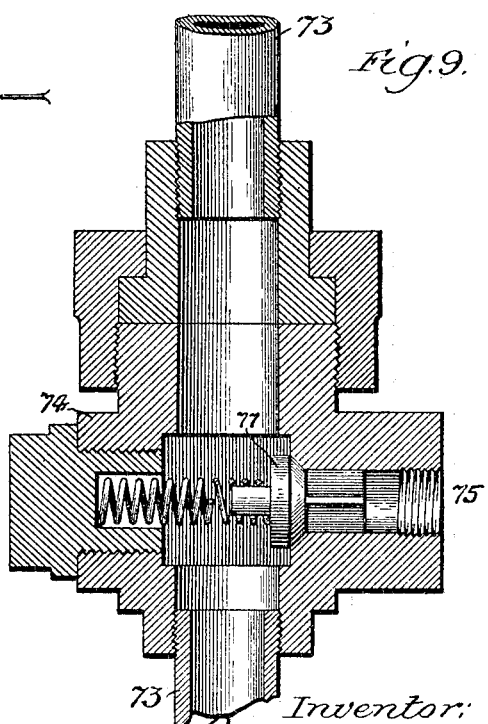

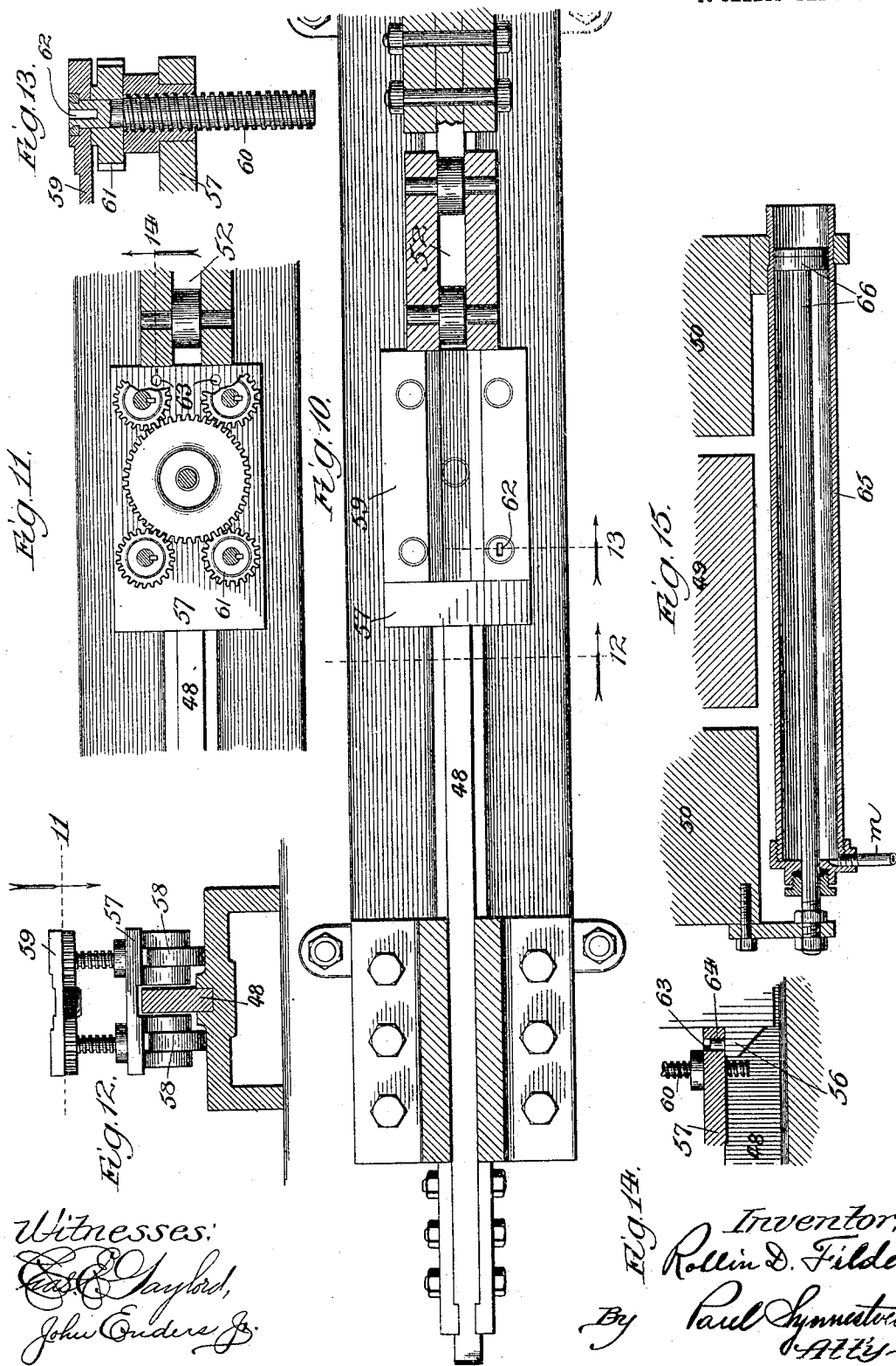

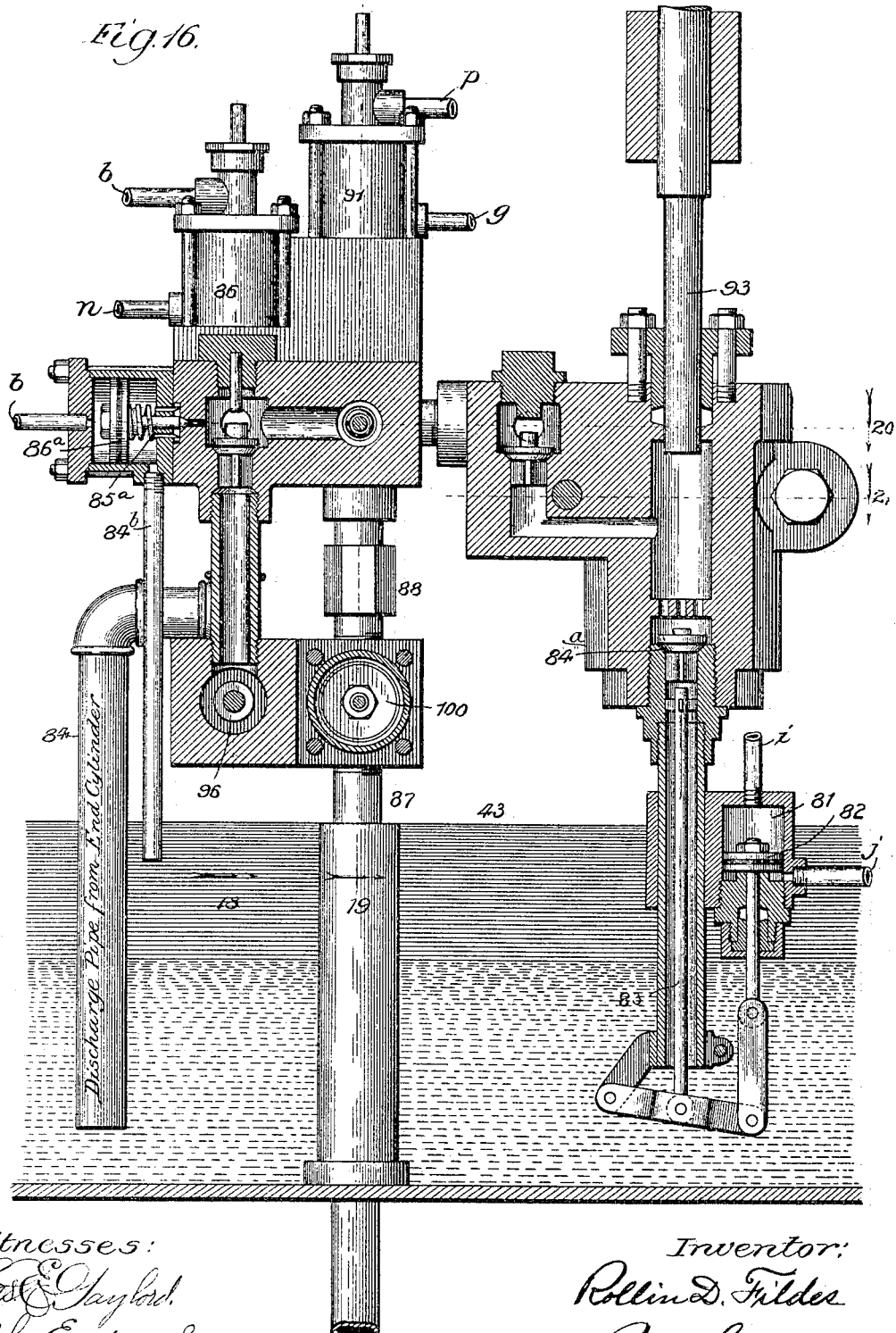

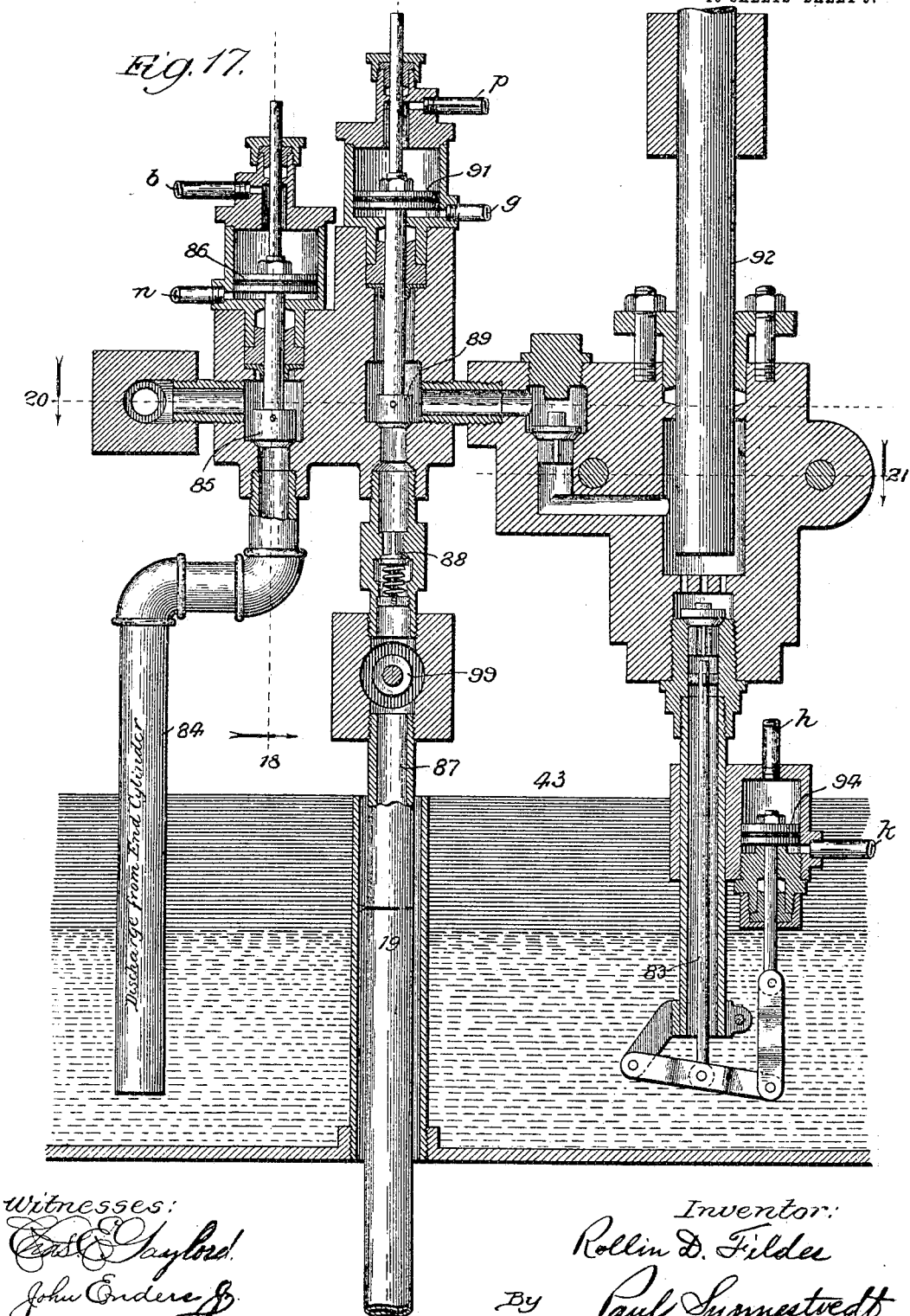

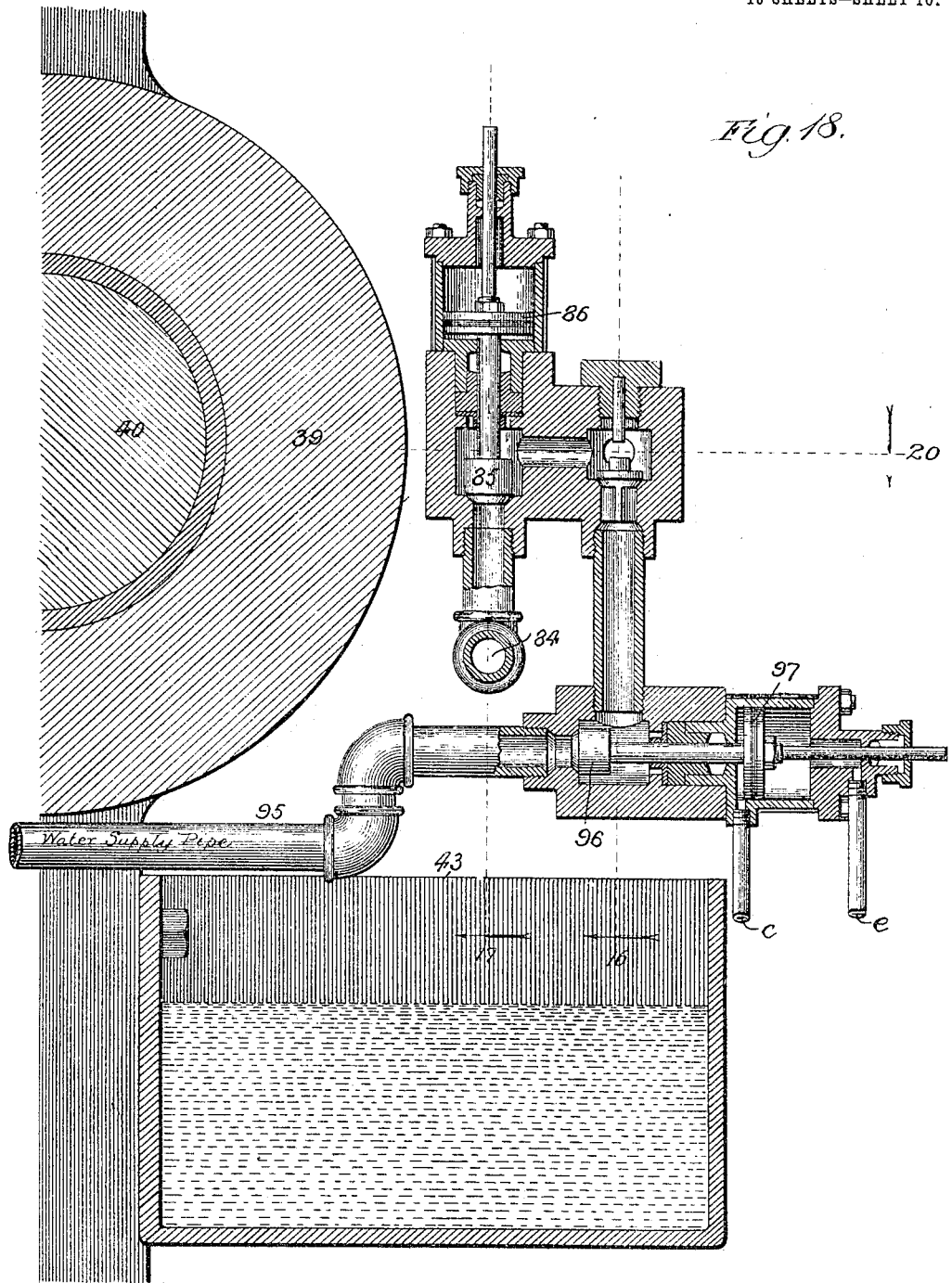

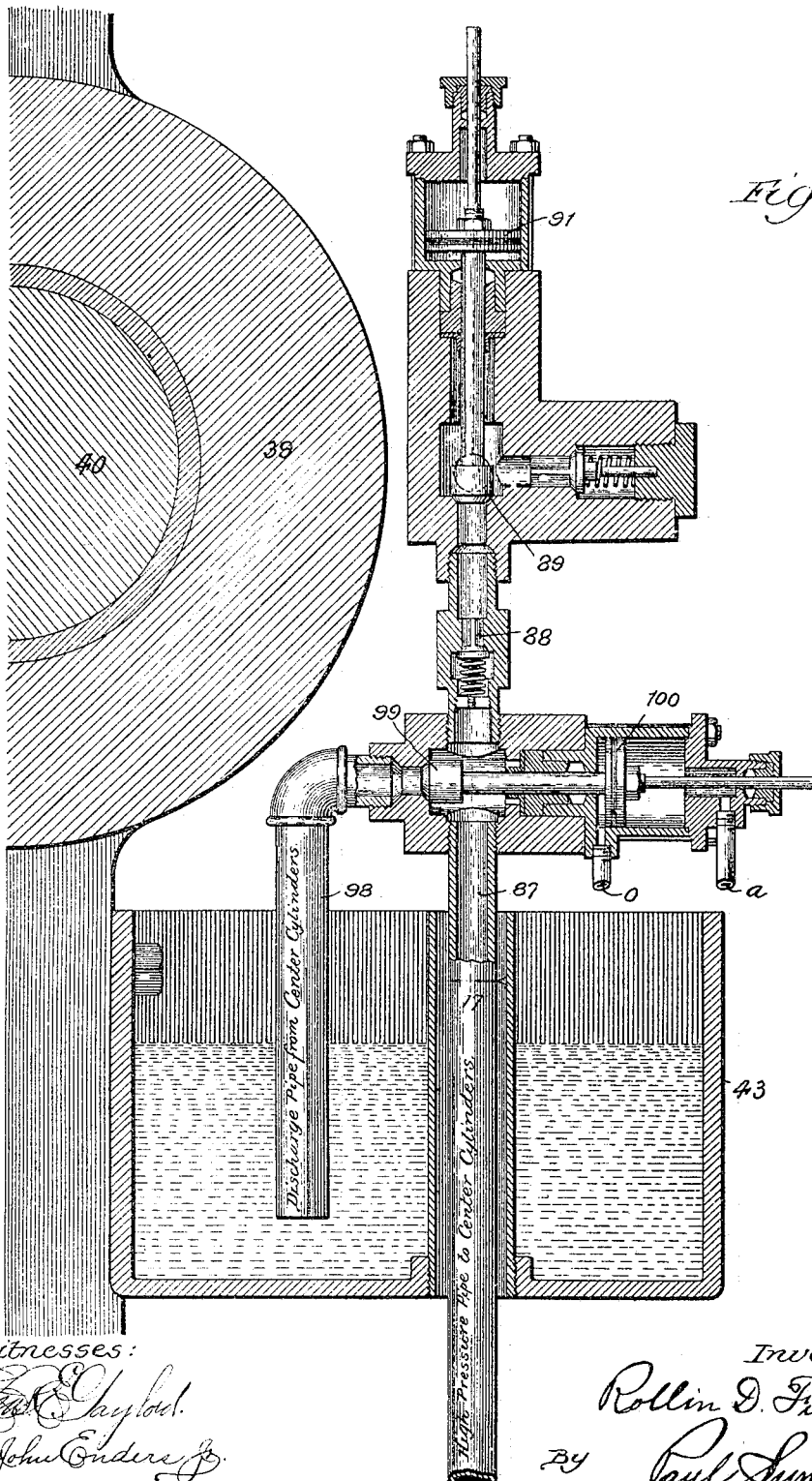

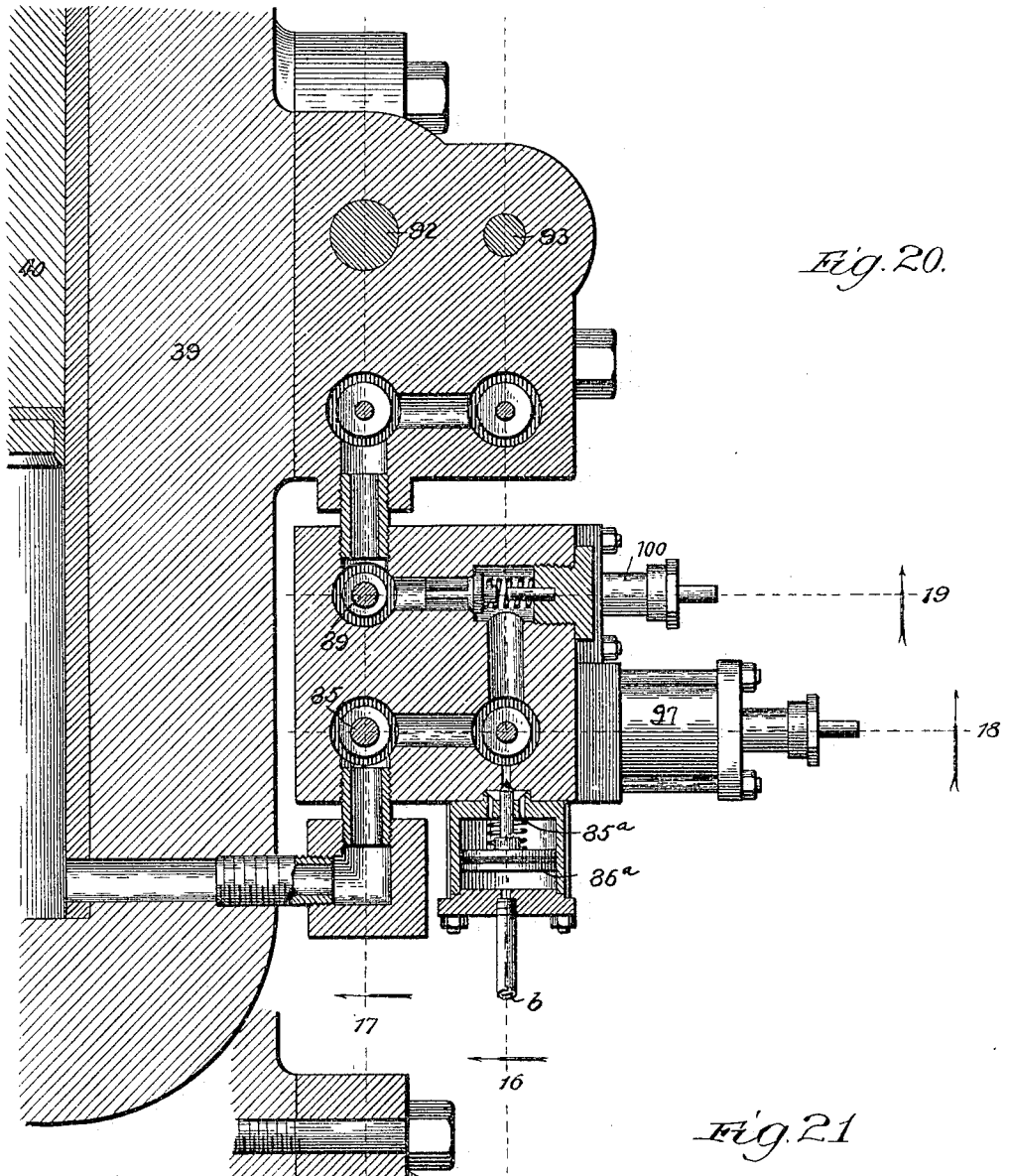

No. 799,229. PATENTED SEPT. 12, 1905.
R. D. FILDES.
HYDRAULIC PRESSURE MACHINE.
APPLICATION FILED FEB. 6, 1902.
16 SHEETS—SHEET 13.
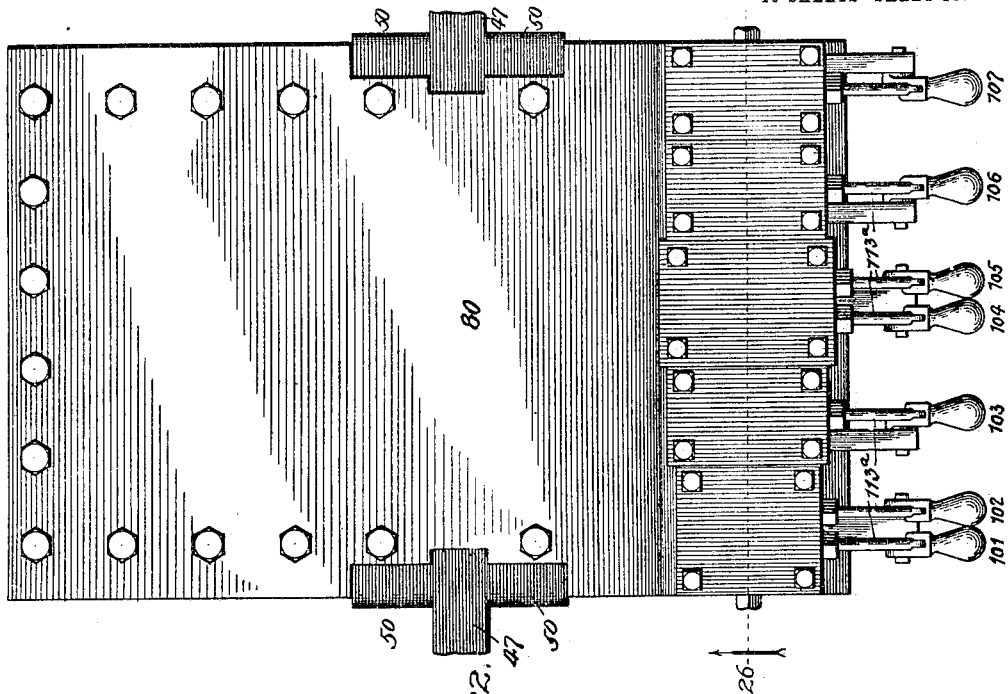
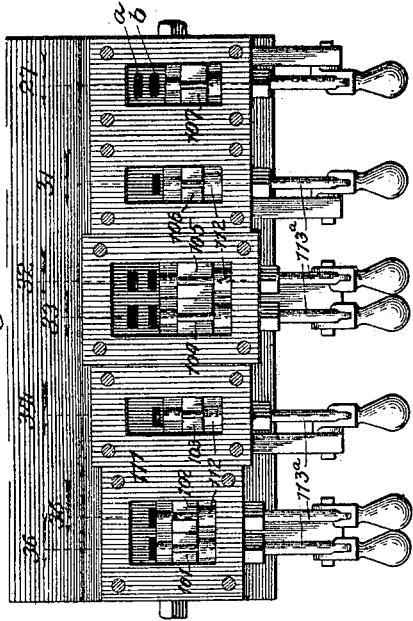
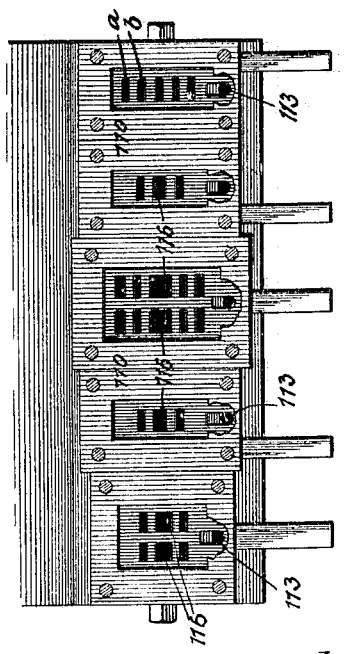
Witnesses:
Inventor:
Rollin D. Fildes
By Paul Synnestvedt
Att'y.

No. 799,229. PATENTED SEPT. 12, 1905.
R. D. FILDES.
HYDRAULIC PRESSURE MACHINE.
APPLICATION FILED FEB. 6, 1902.
16 SHEETS—SHEET 14.
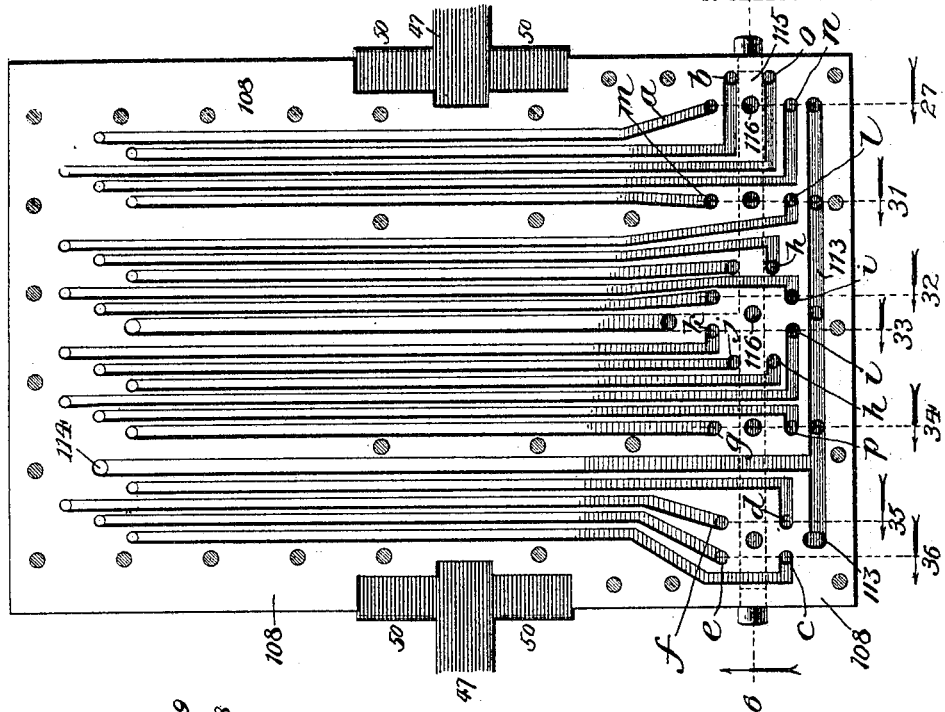
Witnesses:
Inventor:
Rollin D. Fildes
By Paul Synnestvedt
Atty No. 799,229. PATENTED SEPT. 12, 1905.
R. D. FILDES.
HYDRAULIC PRESSURE MACHINE.
APPLICATION FILED FEB. 6, 1902.
16 SHEETS—SHEET 15.
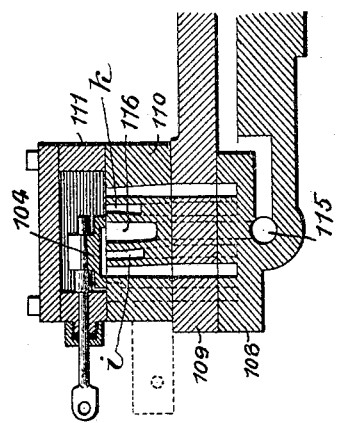
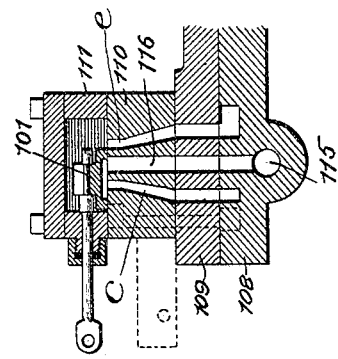
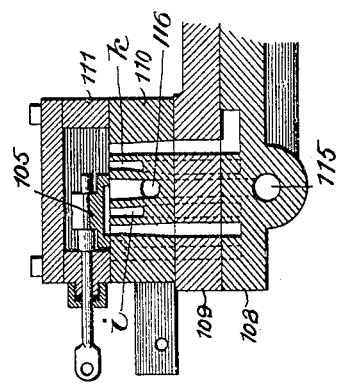
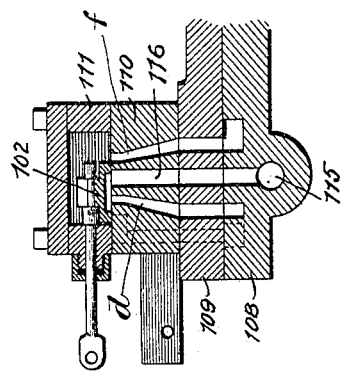
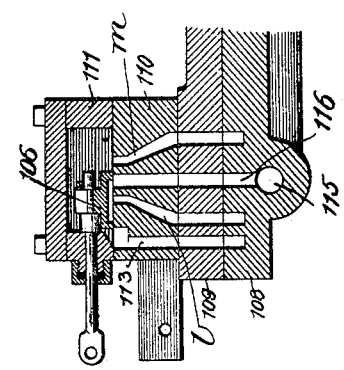
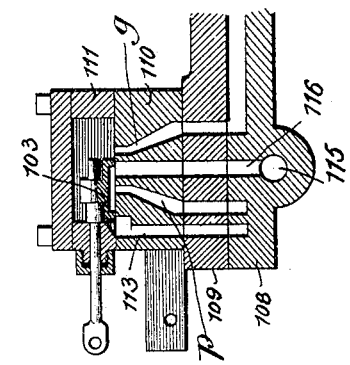
Witnesses:
Chas P. Gaylord.
John Enders Jr.
Inventor:
Rollin D. Fildes
By Paul Synnestvedt
Att'y

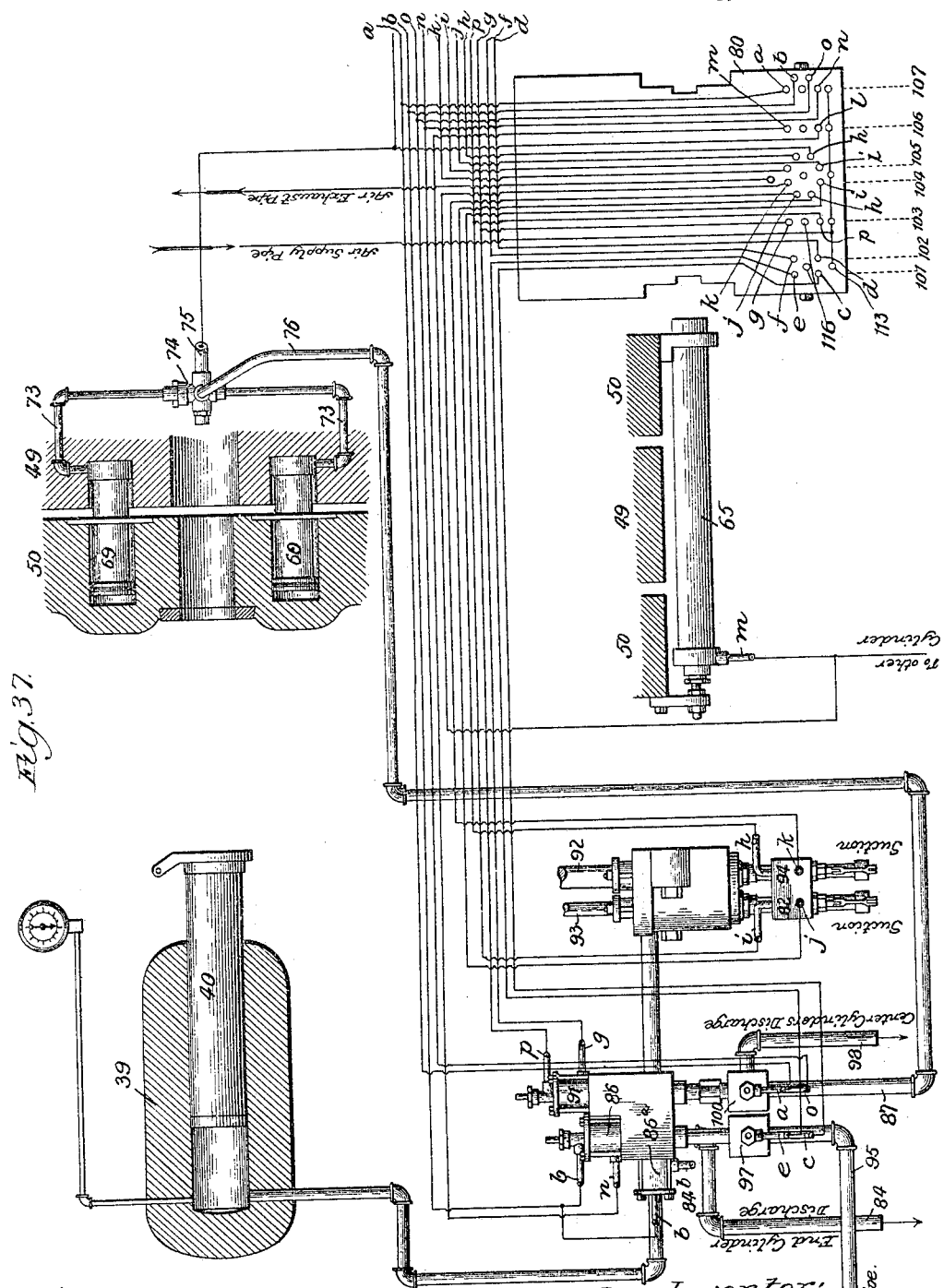

UNITED STATES PATENT OFFICE.

ROLLIN D. FILDES, OF CHICAGO, ILLINOIS, ASSIGNOR OF ONE-HALF TO LE GRAND PARISH, OF CHICAGO, ILLINOIS.

HYDRAULIC-PRESSURE MACHINE.

No. 799,229.         Specification of Letters Patent.         Patented Sept. 12, 1905.

Application filed February 6, 1902. Serial No. 92,936.

*To all whom it may concern:*

Be it known that I, ROLLIN D. FILDES, a citizen of the United States of America, and a resident of Chicago, in the county of Cook and State of Illinois, have invented certain new and useful Improvements in Hydraulic-Pressure Machines, of which the following, taken in connection with the accompanying drawings, is a specification.

This invention has reference to improvements in hydraulic pressure machines, whereby to increase the facility of control thereof, and consequently the amount of work which can be done thereby, to enable the operators to exercise greater certainty and quickness of control, and to make it possible to govern the operation of the pressure machine or several hydraulic rams so as to exert force in different directions and at different times and places, as may be desired, all of the operations being under the control of a man who manipulates a switch-board located in some suitable or convenient place.

Another object of my invention is to provide a pressure machine of the kind specified, which is peculiarly useful for pressing wheels on and off axles, and in such application of my improvement it is possible to push both wheels on an axle at the same time, to push them both off at the same time, to push either one wheel or the other wheel on or off, as may be desired, separately, or in case the wheels after being pressed on happen to be put on too far, or for any other reason the position of either or both of them is to be changed, to make it possible for the operator readily to alter the position of the wheels without taking the wheels or axle out of the machine.

Another object of my invention is to provide in combination an end resistance device, such for example as the usual form of end hydraulic ram construction, and certain center head mechanism, combined with means for applying power to the said center head to force it toward the end resistance device, whereby when used, for example, in connection with wheel and axle work, the wheel or wheels can be forced out by the center heads, the end rams operating as resistance devices.

The above, as well as such other objects as may hereinafter appear, I attain by means of a construction which I have illustrated in preferred form in the accompanying drawings, wherein I have shown a machine embodying my improvements, in which I have shown an axle with two wheels thereon in position in the machine, and the several parts and operative mechanism in what may be called neutral position.

In the said drawings Figures 1 to 15 inclusive relate mainly to the construction of the main portion of the machine, or the framework thereof.

Figures 16 to 21 inclusive have special reference to the valve and pump mechanism of the several hydraulic rams, and Figures 22 to 36 inclusive have special reference to the details of the valve operating mechanism, or what I have called switch-board device, which has the manually operated handles thereon.

Figure 2 is a section taken on the line 2 of Figure 1.

Figure 3 is a section with certain of the parts in elevation, taken on the line 3 of Figures 1 and 2, and showing particularly the construction, in horizontal sectional view, of one of the end rams and the pumps attached thereto.

Figure 4 is a vertical section taken on the line 4 of Figure 3, showing the detail construction of the center head and intermediate frame casting, with the ram devices of the same, the axle and two wheels being also shown in position in the machine as in Fig. 1.

Figure 5 is a view partly in section, the section being taken on the line 5 in Figures 1 and 4.

Figure 6 is a section taken on the line 6 of Figures 1 and 4.

Figure 7 is an elevation intended to show certain of the connections to the center heads.

Figure 8 is a section taken on the line 8 of Figure 7, showing in detail the construction of the connecting device where the air and water supply joins to pass to the center head rams.

Figure 9 is a section taken on the line 9 of Figure 8.

Figure 10 is a section taken on the line 10 of Figures 1 and 2, showing the lower portion of the frame construction.

Figure 11 is a plan sectional view on the line 11 of Figure 12, showing in plan view the adjusting mechanism employed for the wheel carriage.

Figure 12 is a sectional view taken on the line 12 of Figure 10, showing in transverse position the wheel carriage and a portion of the frame.

Figure 13 is a sectional view on the line 13 of Figure 10, showing in detail a portion of the adjusting mechanism for the wheel carriage.

Figure 14 is a sectional view on the line 14 of Figure 11, showing another detail relating to the wheel carriage mechanism, and Figure 15 is a sectional view on the line 15 of Figure 5, showing the construction and mounting of the cylinder employed for retracting the center heads of the machine.

Figure 16 is a view taken mainly on the section indicated by the line 16 on Figures 2, 3, 18, 20, and 21, and is intended to show certain of the parts relating particularly to the hydraulic valve mechanism, and the fluid-actuated devices controlling the same.

Figure 17 is a view taken on the section indicated by the line 17 on Figures 2, 3, 18, 19, 20, and 21, and shows other portions of the valve mechanism and the fluid actuated piston devices which control the same.

Figure 18 is a sectional view taken on the line 18 of Figures 1, 3, 16, 17, and 20, and shows still other details of the valve mechanism which govern the operation of the rams, and of the fluid actuated piston devices which control such valve mechanism.

Figure 19 is a sectional view taken on the line 19 shown on Figures 1, 3, 16, 17, and 20, and also relates to the valve mechanism governing the rams, and the fluid actuated piston devices which operate said valve mechanism.

Figure 20 is a sectional view on the line 20 of Figures 16, 17 and 18, and shows other portions of the valve mechanism of the rams, and the controlling or actuating devices thereof.

Figure 21 is a section on the line 21 of Figures 16 and 17.

Figure 22 is a plan view of the switchboard mechanism with the valve chest covers in place.

Figure 23 is a partial plan view with the covers removed.

Figure 24 is a partial plan view with the covers and valves both removed, in order to show the arrangement of valve ports.

Figure 25 is a plan view showing the plate in which the several passages and port openings are made, the said passages and port openings being formed principally by channels in said plate, which are afterward covered by another plate placed over the lower one.

Figure 26 is a sectional view on the line 26 of Figure 25.

Figure 27 is a sectional view through one of the valves taken on the line 27 of Figure 25.

Figure 28 is a view in perspective of one of the valves, showing the general construction of the same.

Figure 29 is a detailed view of the valve-stem.

Figure 30 is a detailed view showing a stop ferrule to be placed upon the valve-stem to limit the outward movement of the valve.

Figure 31 is a sectional view taken on the line 31 of Figures 23 and 25.

Figure 32 is a sectional view through another of the valves, taken on the line 32 of Figures 23 and 25.

Figure 33 is a sectional view taken on the line 33 of Figures 23 and 25.

Figure 34 is a sectional view taken on the line 34 of Figures 23 and 25.

Figure 35 is a sectional view taken on the line 35 of Figures 23 and 25.

Figure 36 is a sectional view taken on the line 36 of Figures 23 and 25, and

Figure 37 is a diagrammatic representation of the switch-board and its connections, on one half of the machine, showing the pipes leading from the switch-board to the several valve actuating pistons of the hydraulic valve mechanism, the same being shown not as pipes, but as single lines laid out substantially like electric circuits are laid out on controller plans, for simplicity of illustration.

Figure 1:
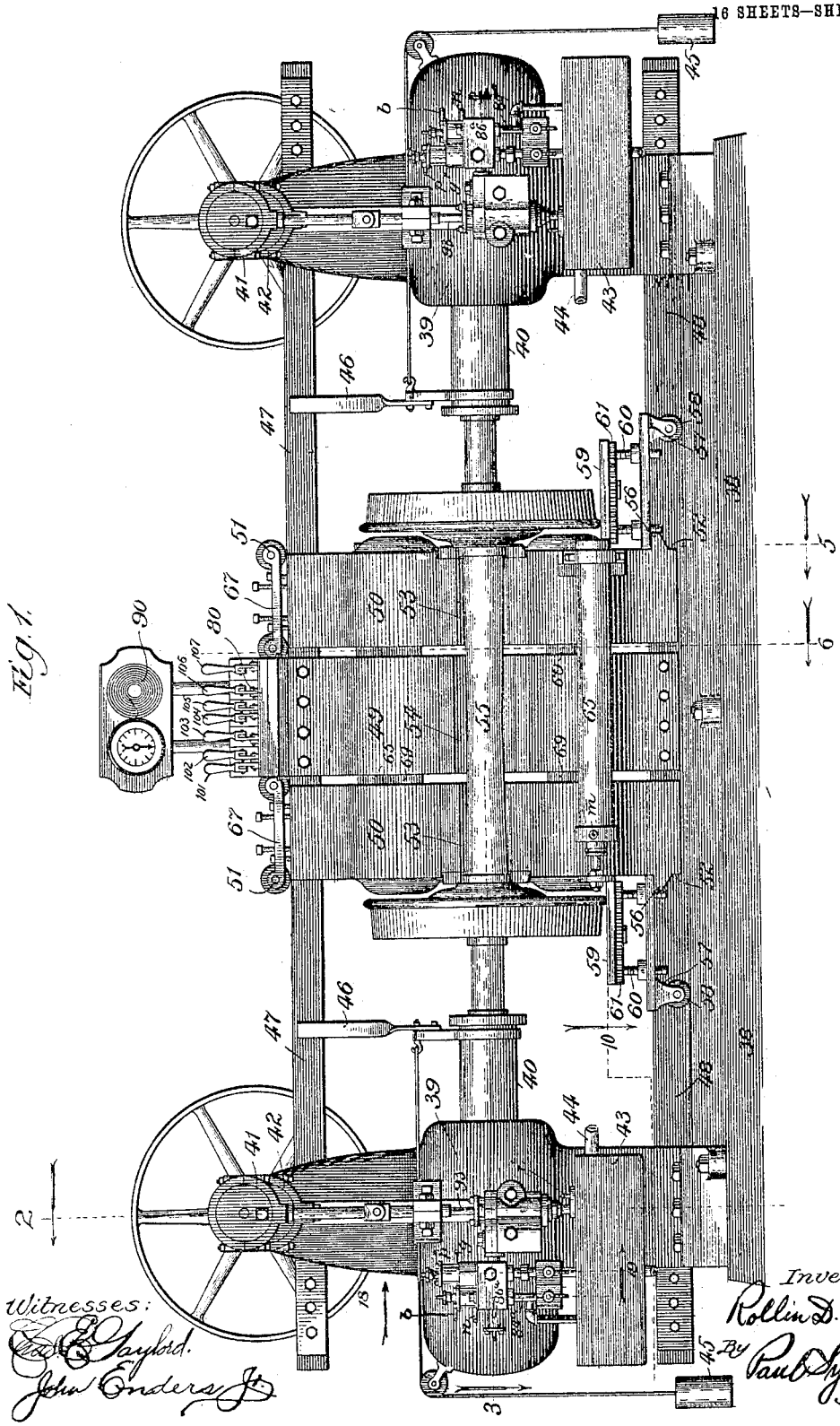
Figure 1 is a front elevation of a machine embodying my improvements, showing an axle with a pair of wheels thereon mounted in the machine in position just before the parts are to be operated to press the wheels off the axle.

Referring now more particularly to Figures 1 to 15 inclusive, which, as before stated, have particular reference to the main construction or frame of the machine, it is to be observed that in carrying out my invention I provide first a main bed or foundation 38 upon which are mounted the end cylinders 39 which carry the end rams 40.

To the end cylinders 39 are secured two pumps operated by eccentrics 41 and 42, one of said pumps being of larger diameter than the other, as is usual in constructions of this character. The said pumps are arranged to operate from water stored in the tank 43, which is provided with the usual overflow 44, and some suitable means for filling the tank when required. Adjacent to the pumps there is secured a casing, or plurality of casings, which hold the several valvular devices which will be hereinafter described in detail.

The rams 40 are counterbalanced in the usual way by means of a weight 45, and kept from rotating by means of the guide arms 46, which are arranged to engage the upper tie bar 47 in the manner shown, the said upper tie bar being immediately above the lower tie bar 48, which rests upon the upper side of the bed of the machine.

The two end rams, with their connected pumps, and valvular mechanism, with the controlling means for actuating the same are substantially duplicates of each other, and therefore description of both will not be necessary, even although, as will appear later, my switch-board mechanism is so arranged that either end may be operated independently if desired either in pushing on or pulling off of wheels.

In the middle of the machine, and firmly secured to the upper and lower tie bars I provide an intermediate frame 49, at each end of which, — that is, on each side of which relative to the end portions of the machine, — are arranged center heads 50, carried by carriages 51 on the upper tie-bar 47, and slotted or bifurcated at 52 to straddle the lower tie-bar 48, and provided also with recesses or gaps 53, which like the gaps 54 in the intermediate frame 49, provide means for inserting the axle 55, when the machine is in operation, the said gaps opening laterally at one side, so that the axle can be rolled or pushed in and out without difficulty.

The center heads, are provided at their lower ends with projections 56, on which rest one end of the wheel carriages 57, the other end whereof is supported by rollers 58, which bear upon the bed of the machine on either side the lower tie-bar 48. The wheel carriage is provided with a table 59 upon which the wheel rests, and with adjusting devices comprising a plurality of screws 60 arranged to raise and lower the said table, the screws 60 being formed with their upper ends seated in gears 61, which, by means of a suitable key inserted in the key seat 62 (see Figures 12 to 14 inclusive) can be turned simultaneously to effect the desired adjustment of the table. The end of the table which is next the center head is provided with openings 63 engaging pins 64 in such a way that the table and carriages will be moved with the center heads as they travel in and out. (See Fig. 14.)

As a means for retracting or drawing the center heads inward or toward each other I provide a cylinder 65 within which is a fluid actuated piston 66, the piston being secured to one of the center heads and the cylinder to the other, so that when fluid pressure is admitted, it acts upon the piston and cylinder to exert a pull upon both of the center heads, as will be clearly evident from examination of the sectional view given in Figure 15. The cylinders 65 are in duplicate, that is, there are two of them, and they are arranged in diagonally opposite positions, the one above the center of the machine, and the other below, and the one at the right and the other at the left, as clearly indicated in Figure 6, in order to exert a balanced pull upon opposite sides of the center of the two center heads. The form of the gap 54 in the intermediate frame, and the gap 53 in the center head is clearly shown in Figures 6 and 5 respectively and the center heads 50 are provided with suitable means for raising and lowering them or adjusting their positions relative to the carriage 51, as indicated at 67 in Figures 1 and 4. The plate 67 is attached to the center head 50 by adjusting and set screws, and rests on the tie-bar 47 by rollers 51, set in slots at its end, as shown in Figures 4 and 5.

The detailed construction of the ram which actuates the center head, is clearly shown on Figure 4, upon an examination of which it will appear that in these center heads, above and below the horizontal central plane, there are arranged cylinders 68, within which is a telescopic ram piston, formed of the outer part 69 and the inner part 70, with packing, as shown at 71, the inner piston 70, being tubular and connecting by the opening 72 with the supply pipe 73, which at 74, (see Figure 7) is provided with a casing that has both an air and a water inlet, the air inlet being marked 75, and the water inlet 76, and the air inlet being supplied with a non-return check valve 77, which is for the purpose of preventing the water, when the hydraulic pressure exceeds the air pressure, from passing out into the air inlet pipe 75. The part 70 being provided with a stationary head 78, socketed in the recess in the intermediate frame of the machine, gives the telescopic ram somewhat of a lateral movement, and thus permits the more ready adjustment of the movable head to the requirements of the work. The employment of the telescopic ram just described enables me to secure a long stroke of the center heads, in spite of the very limited space between two adjacent car wheels set on an axle of standard gage, and this is an important feature of my improvement. The use of the central passage in the telescopic ram makes it possible to make the fluid supply or inlet connection through the intermediate frame, and does away with the necessity for any kind of movable pipe joint or connection between the inlet or supply pipe and the movable head, which is an advantage that will be appreciated by those skilled in this art. To avoid danger of having the part 69 of the telescopic ram forced out of its cylinder 68 and to carry the piston 69 outward with the head 50 I fix upon the face of abutment 50 the retaining plate as shown in Figure 4, which has an opening fitting the part 69 and thus retains both the plunger and the sheath 79 in place.

As a means for placing the control of the entire machine in the hands of a single operator, I arrange a switch-board device which as a whole I have marked 80, which is preferably located just above and attached to the intermediate frame 49, so that the operator can stand in the middle of the machine and observe the action of the same at both ends without moving from his position. Above the switch-board 80 I place the gages 90, to indicate the pressures.

Referring now more particularly to Figures 16 to 21 inclusive it will be seen that I have therein shown in various sectional views the arrangement of the several valvular devices which comprise the mechanism for controlling the operation of the hydraulic rams, there being one set of valves controlling the end rams, and another set of valves for controlling the rams of the center heads, these two sets of valves being duplicated at each end of the machine, and there being a large and small pump in the casing mounted also at each end of the machine. The suction pipes from the several pumps dip into the water of the tank 43 in the usual manner, and the discharge or overflow pipes from the several valves also open into this tank. The valve mechanism controlling the supply of hydraulic pressure to the center heads is located immediately adjacent to, and in the same casing with the other hydraulic valve mechanism at each end of the machine, but is so arranged as to be capable of operation either jointly or separately. The valve mechanism governing the hydraulic passages, as well as the pump devices, are controlled by means of fluid pressure pistons subject to pressures on their opposite sides, regulated or controlled by the switch-board 80. Thus on Figure 16 it will be seen that there is a cylinder 81 containing a piston 82, which has pressure on its opposite sides admitted through the pipes $j$ and $i$, the said piston being connected to the rod 83, whereby the suction valve $84^a$ on the pump may be raised when it is desired to put the pump out of action. Each of the pumps is provided with a like contrivance for controlling or raising the suction valve to throw it out of use.

At the beginning of the action, before there is need of more power than merely enough to move the outer heads into working position, the water supply pressure alone is used. It enters from pipe 95 (Figure 18) through valve 96 and the vertical pipe and check valve above it, thence to and through the chamber above valve 85 and laterally directly into cylinder 39 behind piston 40, as clearly shown in Figure 20, and thus thrusts the ram 40 against the axle of the wheel, this pressure being thus nicely balanced against the pressure on the other ram. When it is desired to increase the pressure the piston 94 (Figure 17) is retracted dropping the check valve under the pump, and the valve 89 being also opened by piston 91 the high pressure fluid, pumped from tank 43 by piston 92 enters through pipes 87 and 76 to the center rams, and at the same time (Figure 20) through the check valve to the right, around valve 85 and into the end cylinder 39. The feed pipe pressure is not used to move the center rams, but after the hard initial pressure, their motion is continued by the air pressure in pipe 75 and through valve 77 (Figure 9.)

By referring to Figure 17 it will be seen that the discharge from the end cylinder, which is through the pipe 84, is controlled by means of a hydraulic valve 85, which receives its movement through the piston 86, operated by air pressures on its opposite sides, admitted through the pipes $b$ and $n$. From the same figure it will be seen that the supply pipe 87 leading to the center heads, (which is provided with the check valve 88 to prevent return of pressure when the center heads are being held with pressure on) is controlled by means of a hydraulic valve 89, which is actuated by the piston 91 subject to fluid pressures admitted on its opposite sides through the pipes $p$ and $q$. This Figure 17 also represents in section the large pump 92, which, like the small pump, 93, shown on Figure 16, is controlled in a similar manner by means of a piston 94, which in this instance receives pressure on its opposite sides, through the pipes $h$ and $k$.

On Figure 18 it will be seen that the water supply 95 leading to the end rams is controlled by the valve 96, which receives its movement from the piston 97, which, like the other valve controlled pistons, is subject to pressures on its opposite sides received through the pipes $e$ and $c$. This water supply pipe which is marked 95 may be taken from any convenient source of pressure supply.

On Figure 19 it will be seen the discharge pipe from the center cylinder, which is marked 98, is controlled by the valve 99, receiving movement through the piston 100, subject to air pressures from the pipes $a$ and $o$.

In order to facilitate the opening of the outlet valve 85, (see Figures 17 and 20) which controls the discharge from the end cylinders, means is provided in the shape of the small leak valve $85^a$, Figure 16 which, through the piston $86^a$, subject to the control of the pressure in the pipe $b$, operates when the pressure is removed from said pipe to permit leakage or escape of a certain quantity of the pressure above the valve 85 and the more ready unseating of the same by the fluid pressures acting on the piston 86. The water which escapes in this manner is allowed to drain off through the tube $84^b$ to the tank 43 as shown in Figure 16.

The switch-board mechanism is illustrated in detail as already stated, in Figures 23 to 36 inclusive, and by reference to these figures it will be seen that it consists primarily of a table 108, above which is secured a cover plate 109, on top of which at one end is the valve seat block 110, over which are fastened the valve chest covers 111, containing in their respective chambers the several valves numbered 101 to 107 inclusive. Valve 107 with the several ports and openings which it controls, together with the handle for operating the same, is clearly shown in Figure 27, and sectional views of each of the other valves are clearly shown in Figures 31 to 36 inclusive, each valve being shown in what I shall designate an outward position, in which the ferrule 112 affords a stop to prevent the closure of the inlet opening to the valve chamber, which comes up through the port, which in each case is marked with the same number, namely, 113. This inlet port receives its supply of compressed air through the inlet passage 114, (see Figure 25). Connection between each valve handle and valve is made by means of the valve stem $113^a$, (shown in Figure 29). The D cavity of each of the valves is connected with the exhaust pipe 115 by means of an exhaust port, which I have marked in each case 116. The other ports and passages are all indicated by reference letters instead of numerals, corresponding reference letters being applied to the corresponding pipe connections adjacent to the several valve mechanisms which the several passages control, for convenience of reference. These several ports and passages in the functions performed on the opening and closure of each, will be best understood however, by reference to the description of the operation of the machine, which I will now proceed to give as follows.

In this description of the operation of the mechanism, I will make particular reference to Figure 37, on which is the diagrammatic representation of the several pipe connections with the valve seat and port openings shown, the valve mechanism connected to the several pipes being of only one half of the machine, since the other half of the machine is a duplicate of the half shown. The seven valves are indicated by dotted lines adjacent to the switchboard, and numbered respectively from 101 to 107 inclusive, but the valves themselves are not shown on this figure.

Assuming now that it be desired to take a pair wheels off an axle, the first thing to be done is to turn air into the inlet connection of the switch-board, as a supply for the several valve mechanisms thereof. In doing this it must be observed that the switch valves, numbered 101 and 102, are in proper position, which is in starting, the extreme outer position, which uncovers the ports $e$ and $f$, and establishes communication between the ports $c$ and $d$ and the exhaust port 116. These valves 101 and 102 serve to control the outside water inlet to the rams, one of them controlling the left hand ram, and the other the right hand ram, and it is necessary that these handles be in the outer position, as stated, when the machine is first brought into service, in order to prevent these rams from being forced out by the pressure of the outside water supply, into a position in which they would interfere with putting the axle and wheels into place in the machine.

The air having been turned on, and the valves 101 and 102 pushed into proper position as described, the wheels mounted upon the axle are rolled on to the carriage, the wheels resting upon the wheel carriages, or more properly the tables thereof, which are then adjusted if necessary, to bring the axle to the right height to be operated upon. It is to be observed that when this is being done the valve 106 must be left in its outer position, which serves to keep the air out of the center ram, and admit air into the retracting cylinders holding the center heads inward.

It should next be observed that the valve No. 107 is out, since this is necessary to close all the outlets from all of the several rams, it being valve No. 107 which is used to close the hydraulic valves in order to retain the pressure back of a part or of all the rams, as occasion may require. This closure of all the hydraulic outlet valves is produced by an outward movement of valve 107, because such outward movement admits air pressure through $a$ and $b$ into the pipes which at their other ends are marked with corresponding reference characters, which, as will be readily seen by examination of the drawings, act at the corresponding points on the pneumatic pistons controlled through such pipes, to close all of the several hydraulic outlet valves, the outlets from the center head being closed by the action of the pistons 100, at each end of the machine, and the outlets from the end rams being closed by a double acting mechanism including the pistons 86, which actuate the hydraulic valves proper for the end rams, and $86^a$, which actuate the bleeding valves, which, in reality, must be closed at the same time in order to prevent escape of pressure to the drain pipes $84^b$. The port and pipe marked $a$ is that which controls the outlet from the center head, and the port and pipe marked $b$ is that which controls the outlet from the end ram and the bleeding valve, as described.

The next thing to be done, the axle and wheels having been put in place, is to bring the end rams up in contact with the ends of the axle to act as resistance devices against the push of the center heads necessary to remove the wheels from the axle. This is accomplished by pushing the valves 101 and 102 inward, to a position which will uncover the ports $c$ and $d$, which, by the admission of air to the pipes marked $c$ and $d$ will operate upon the pistons 97, one of which is at each end of the machine, the port $c$ controlling the left hand end, and the port $d$ the right hand end, which pistons 97 serve to open the valve which admits water from the outside supply pipe 95, whereby the end rams are moved up, as stated, into contact with the ends of the axle. After this has been accomplished, the valves 101 and 102 are moved back into a position which will close the ports $c$ and $d$, and open the ports $e$ and $f$, which, by the D cavities of the valves 101 and 102, serve to exhaust the passages $c$ and $d$, and by the admission of air, as described, to the ports $e$ and $f$ and the pipes connected therewith, serve to close the water supply valves 96 at each end of the machine, and prevent any reflux of water, thus affording a double check, since the said water supply valves are also provided with additional check valves which seat automatically, and would of themselves prevent undesired return of pressure when the heavier or higher pressure from the hydraulic pumps is brought into action.

The next thing required to be done is to open the hydraulic valves which lead from the hydraulic pumps into the center head rams, so that when the pumps are put into operation the water can flow into the center head rams and act to press off the wheels. This is accomplished by the valve 103, which being in a position which will uncover the port $g$, through which air will then be admitted to the pipe $g$, and operating upon the pistons 91 at each end of the machine serve to open the valves connected therewith, so as to permit the pressure from the pumps to go to the center heads. It is to be here observed that when water is thus admitted to the center heads, the corresponding pressure is also admitted to the end rams, (there being free passage from the pumps to the cylinders thereof) so as to create a balance of pressure, since it is the end rams which must, by their pressure upon the ends of the axle, hold the axle in fixed position while the wheels are being pressed off, and prevent any tensional strain being thrown upon the axle itself, which, in case of extreme pressures, might tend to pull the axle apart. The air admitted through port $g$ will pass, as seen on an examination of Figure 37, to both ends of the machine, and act upon both ends in the same manner.

The valves which control the admission of hydraulic pressure to the center head rams having been opened, the next thing to do is to get the pumps in operation, which is accomplished through the movement of the handles of the valves No. 104 and 105, which are now pushed clear in so as to admit air into the ports $h$ and $i$, of which ports $h$ control the larger pumps, and ports $i$ the smaller pumps, there being separate ports for each end of the machine, those for the left hand end being controlled by the handle of the valve 104, and those for the right hand end by means of the valve 105. The admission of air to the ports $h$ and $i$ acts, as will be seen on careful examination of the several figures, to permit the seating of the pump suction valves.

By examination of the drawing showing the location of the ports $h$ and $i$ on the switch-board, it will be apparent that by a greater or less movement inward of the valves controlling such ports, the port $i$ alone, or the port $h$, in addition to the port $i$ can be opened, that is to say, if it be found that the pressure generated by operating the two pumps together, is not sufficient to move the wheels, or start them from the axle, a backward movement of the handles of the valves 104 and 105 will cut off the ports $h$, which serve to bring the larger pump into operation, and by opening only the ports $i$, will bring only the smaller pump into operation, and these smaller pumps thus being used alone, because of their smaller diameter, will generate a higher pressure, which will serve to start the wheels if they need a greater pressure, after which the two pumps can be brought into operation to hasten the rapidity of the operation, if desired.

The purpose of providing the two separate valves No. 104 and 105 is, to make it possible to control either end of the machine separately, that, is to make it possible to operate either of the pump devices independently of the other.

So long as the ports $h$ and $i$ are uncovered, the check valves of the pumps will remain seated, and operate so that the pumps will continue to work until the ports $h$ and $i$ are closed by movement of the valves controlling them. This is permitted until the wheels are pushed off, that is, until they are sufficiently far off so that they can be moved by other means.

After the wheels have been both started off, until, as stated, they can be moved by other means provided in the machine, the handles 104 and 105 are pulled out in order to stop further action of the pumps, which takes place through the exhaustion of ports and passages $h$ and $i$, and the admission of air through the ports and passages $k$ and $j$, which by the operation of the pistons 94 and 82, operate to unseat the suction valves. Valve 106 is now pushed in, in order to admit air to the center rams, the inlet port being marked 1, and the same movement of valve 106, it is to be observed, acts to exhaust the air from the retracting cylinders, by means of the ports $m$, which in such position of the handle is put into communication with the exhaust ports. By this means the wheels are pushed clear off until they touch the end rams, when the valve 107 is moved to position to uncover the port $n$ which actuates the piston 86 to uncover the valve controlling the escape ports from the end cylinders, the purpose of this being to permit the water to exhaust from the end cylinders, so that the end rams will be retracted and make room to remove the wheels. During this operation the pressure must be retained on the center heads, so that there will be no delay in continuing the movement of the wheels to push them entirely off the ends of the axles, this retention of the pressure in the center heads being accomplished by means of the presence of the check valves in the pipes leading to the center heads, marked 88 in Fig. 17.

The wheels having been entirely removed from the axle, the axle itself is now rolled laterally out of the gap in the machine onto suitable rails provided for the purpose, and the wheels at the same time are held in upright position by means of suitable devices as for example, small wedges or other holding pieces inserted under the conical portion of the wheel tread.

The remainder of the hydraulic outlet valves 99 are now opened by pushing the handle of valve 107 further inward, such opening being accomplished by the admission of air to the port and passage marked $o$, operating on the piston 100.

The center heads are now retracted by the admission of air to the retracting cylinders through movement of the valve 106, which, as before stated, at the same time that it shuts off the supply of air to the center heads, opens a passage to the retracting cylinders through the port $m$. The water and air, which have been admitted to the rams of the center heads, now finds its escape back to the water pans or tanks, as the center heads are drawn by the pressure in the retracting cylinders.

From the above it will be observed that by using both water and air pressures in the center heads, as described, I am enabled to greatly quicken the operation of removing the wheels, since after the water-pressure has started the wheels loose, the air pressure is sufficient to push them the greater portion of the balance of the way, and operate with much greater rapidity than the water pressure can.

Assuming now that it is desired to press a couple of wheels onto the axle, it is first necessary to mount the wheels on the axle and roll the two wheels and axle up into position in the machine, after which the wheel setting blocks which are shown on Figure 3, and which I have marked 120, are swung around into position to take the compression strain against the wheels, at the same time straddling the journal end of the axle. The handles of the valves 101 and 102 are now pushed in in order to let water from the outside water supply move the end rams out until the wheel setting blocks engage the wheels, after which the valve 103 is moved to admit air to port $p$, which operates pistons 91 to cut off the center heads, when the pump mechanism is operated, just as in the case of the use of the center rams, until the wheels are brought to proper gage, the first one brought to proper position being blocked until the other is also full on, when valve 107 is pushed in in order to release all of the valves, 85 $85^a$ and open the outlets, this operation, so far as the high pressure hydraulic valves are concerned, being facilitated by the device heretofore referred to as shown particularly in Figures 16 to 21, which consists of the small relief or leakage valve $85^a$, controlling the escape or drain passage $84^b$, which is attached to the piston $86^a$, that is held in position to hold the valve shut by pressure admitted through the pipe $b$, or more properly a branch of the pipe $b$. Thus when pressure is admitted to the passage and pipe $b$, it not only operates upon the piston 86, but also upon the piston $86^a$, to close the drain passage, as described. From the above description of the operation of my improved mechanism, it will be evident that in case the wheels have been put on too far, or the position of either is to be changed, this operation can be accomplished without taking the wheels or the axle out of the machine, since both of the wheels can be pressed on, or both off, at the same time, or either one can be pressed on or either one off, as desired.

One of the main features of novelty whereby I accomplish all the desirable results set forth, is the provision of the two center heads, and the means whereby the several portions of the apparatus are controlled with facility by a switch-board mechanism, and whereby any desired part of the apparatus can be controlled independently of other parts, or jointly therewith, as may be desired.

The word "ram" is used herein to mean a fluid actuated self-guiding piston moving in a cylinder, and provided with means on its outer end for thrusting against direct lineal resistance.

Having thus described my invention, what I claim as new, and desire to secure by Letters Patent, is—

1. In a pressure machine the combination of two central movable abutments adapted to engage a wheel on an axle and two outside movable abutments to engage the axle or wheel, with hydraulic means for simultaneously thrusting the central abutments outward and for thrusting the outside abutments inward, respectively.

2. In a pressure machine the combination of two outside movable abutments adapted to engage a wheel or its axle, a center frame between them, a movable abutment on each side of the center frame adapted to engage the wheel and having hydraulic means respectively between each of them and the center frame to move them toward the outer movable abutments.

3. An hydraulic pressure machine comprising the combination with an end resistance device, of a center head and means for applying power to said center head to force it toward said end resistance device, said center head being provided with a wheel carriage secured so as to move therewith, substantially as described.

4. An hydraulic pressure machine comprising the combination with two movable end resistance abutments adapted to engage a wheel or its axle, of center heads adapted to engage a wheel or its axle, an upper and lower tie-bar, said center heads being slotted to engage said lower tie-bar, and supported upon said upper tie-bar, and means for applying power to said center heads to force them toward said end resistance abutments.

5. In a pressure machine the combination of two end rams, a center frame and a center head on each side of said frame, means for thrusting said center heads outwardly, said center heads and center frame being notched in the sides to receive a car wheel axle, substantially as described.

6. In a pressure machine the combination of two movable end resistance abutments adapted to engage an axle or a wheel thereon, two intermediate movable center heads adapted to straddle the axle and engage the wheel, and means for applying equal hydraulic pressure to the center heads to thrust them simultaneously outward and to the outer abutments to thrust them simultaneously inward, substantially as and for the purpose described.

7. A pressure machine provided with two center heads, two retracting cylinders therefor, pistons in said cylinders, and connections between said cylinders and pistons and the said center heads to draw said center heads toward each other.

8. An hydraulic pressure machine comprising the combination with movable end resistance devices, of two center heads, an intermediate slotted frame between said heads, and hydraulic thrust devices operating between the center heads respectively and the intermediate frame.

9. A pressure machine for placing car wheels, comprising end abutments and two intermediate center abutments co-operating therewith, means to support and actuate the center abutments, and a vertically adjustable table attached to each intermediate abutment and adapted to support the car wheel.

10. In an hydraulic pressure machine the combination with two opposing end rams, of a center frame and two movable heads, each having a cylinder and a piston composed of two telescopic parts, the interior of one of which is tubular, to afford a water inlet, substantially as described.

11. An hydraulic presser head in combination with a wheel carriage, constructed with an adjustable table, and means for adjusting said table to raise or lower the wheel, substantially as described.

12. An hydraulic presser head in combination with a wheel carriage, an adjustable table therefor, and devices for procuring the adjustment of said table, constructed so as to be simultaneously movable, substantially as described.

13. The combination with an hydraulic ram, of a center head and means to move it, a wheel carriage, and means whereby said wheel carriage is movable with the center head, substantially as described.

14. An hydraulic pressure machine having a tie-bar, in combination with a movable abutment and means to move it against a wheel on the carriage, a wheel carriage straddling the tie-bar and supported at each side of said tie-bar, substantially as described.

15. The combination with a set of two inside and two outside presser heads, of a set of pneumatically actuated valves for admitting water independently to and discharging the same from the two outside presser heads, and manually operated valves controlling the air pressure for said pneumatically operated valves controlling said presser heads.

16. In a pressure machine the combination with an hydraulic presser head and means for operating the same, of an air-pressure supply and means for introducing the air along with the liquid behind the actuating piston of the presser head, and a check valve in the air inlet to prevent escape of the liquid therethrough.

17. In an hydraulic ram the combination of a cylinder discharge valve, fluid pressure operating means therefor, and a bleed valve for releasing pressure behind the discharge valve to facilitate opening of the same, said bleed valve being operated by the same means that operates the discharge valve.

18. The combination with four fluid pressure actuated abutments, of a set of valve mechanisms for admitting and discharging the fluid to the actuating means thereof fluid pressure means for actuating the valve mechanism thereof, and a central switchboard having manually operated valves controlling the action of the actuating means for the valves of the outer abutments.

19. The combination in an hydraulic pressure machine, of two opposing end rams and two movable center heads, valve mechanisms respectively governing the action of said rams and heads, means for operating the said valve mechanisms, a compressed air supply and a switchboard, common to all the said rams and center heads, having manually operated valves controlling the compressed air to actuate the governing means of the valves for controlling the rams and center heads.

20. In a pressure machine in combination with an adjustable table for supporting the object to be acted on, a center head suspended on adjustable supports, whereby to vary the relative heights of said table and said center head.

21. A pressure machine comprising end rams and center abutments carrying means for expanding the same toward the outer rams, said center abutments being mounted for vertical adjustment in position.

22. An hydraulic ram provided with large and small pumps attached thereto and driven from the same shaft, with fluid operated means for throwing either of said pumps into or out of operation and continuing forward movement of the shaft and of the flow of liquid.

23. In a pressure machine the combination of two end rams and opposing center abutments, with a slotted block hinged to swing sidewise upon the piston of each end ram and adapted to be shifted into line therewith and with the opposing ram to engage a wheel upon an axle and thrust it on said axle.

24. A pressure machine comprising two end rams, each having two abutments to engage both the wheel and axle of a car wheel, and two central abutments between the wheels, provided with means to thrust said abutments outward, and the abutments being notched in the side to receive the axle of the wheel.

25. A pressure machine for placing car wheels, comprising two intermediate movable abutments and two alined end rams adapted to abut against both the axle and the hub of said wheels at once.

26. A pressure machine for placing car wheels, comprising two alined end rams adapted to abut both against the axle and the hub of the wheel, and two intermediate abutments with means for thrusting the abutments outward.

27. A pressure machine for placing car wheels, comprising two alined end rams adapted to abut against both the axle and the wheel hub, and two intermediate abutments provided with a plurality of hydraulic thrust devices arranged to exert equalized pressures about the axle and on the wheel to thrust the wheel outward.

28. In a wheel pressing machine the combination with an end ram adapted to engage either the axle or the wheel, of an inside slotted resistance frame and an intermediate slotted movable abutment provided with means for thrusting the same toward the end ram.

29. In a wheel pressing machine in combination with an end resistance device for the axle, a movable inside abutment provided with a plurality of hydraulic thrust devices operating under like pressure and engaging on opposite radial lines to the axle, whereby the outward thrust on the wheel will be balanced about the axle as a center.

30. In a wheel pressing machine the combination with an end resistance device adapted to engage either the wheel or the axle, of a slotted center frame and a slotted intermediate movable abutment provided with oppositely disposed actuating hydraulic thrust devices.

31. In a wheel pressing machine the combination of an end resistance abutment having means for engaging either the axle or the wheel, a slotted intermediate center head, a slotted frame, and a plurality of balanced hydraulic thrust devices placed between the said frame and the intermediate center head, the thrust devices all operating under the same pressure.

In testimony whereof I have hereunto set my hand in the presence of two subscribing witnesses.

R. D. FILDES.

Witnesses:
PAUL SYNNESTVEDT,
PAUL CARPENTER.